3,005,854
PROCESS OF PRODUCING DL-THREO-L-PHENYL-2-NITRO PROPANE-1,3-DIOL
Franz Braun, Ludwigshafen (Rhine) Oppau, and Erich Haack, Heidelberg, Germany, assignors to C. F. Boehringer & Soehne G.m.b.H., Mannheim-Waldhof, Germany, a corporation of Germany
No Drawing. Filed July 25, 1958, Ser. No. 750,895
Claims priority, application Germany July 27, 1957
2 Claims. (Cl. 260—618)

The present invention relates to an improved process of producing DL-threo-1-phenyl-2-nitro propane -1,3-diol useful in the synthesis of chloramphenicol.

The synthesis of the valuable antobiotic chloramphenicol proceeds through various stages whereby 1-phenyl-2-nitro propane-1,3-diol is an important intermediate. Said compound has been prepared by alkaline condensation of benzaldehyde with a β-nitro ethanol or, respectively, of phenyl-β-nitro ethanol with formaldehyde. By acidifying the resulting aci-nitro salts, mixtures of diastereoismeric nitro propanediols are obtained which are contaminated by by-products. Heretofore, it was not possible to split up said mixture of diastereoisomeric nitro propanedoils because of the lability of the nitro group. Therefore, separation of the components of the diastereoisomeric mixture was carried out after reduction of the nitro group whereby the yields of the desired product are rather low.

It is one object of the present invention to provide a simple and effective process of producing 1-phenyl-2-nitro propane-1,3-diol and of resolving the resulting mixtures of diastereoisomers.

Other objects of the present invention and advantageous features thereof will become apparent as the description proceeds.

In principle, the present invention consists in resolving the mixture of the diastereoisomeric 1-phenyl-2-nitro propanediols-(1,3) obtained by alkaline condensation of phenyl-β-nitro ethanol with formaldehyde or of benzaldehyde with β-nitro ethanol. This resolution takes place when treating said condensation product with agents capable of destroying nitrite ions in weakly acid medium. Such agents are, for instance, hydroxylamine, urea, hydrazine, and semicarbazide and its salts. The use of an aqueous solution of salts of hydroxylamine with mineral acids has proved to be particularly advantageous. The oily product which results from said treatment and which represents a mixture of the free DL-1-phenyl-2-nitro propane-1,3-diols may readily be brought to crystallization under suitable reaction conditions and by use of suitable solvents and particularly of di-n-butyl ether. Surprisingly, the separated crystals represent pure DL-threo-1-phenyl-2-nitro propane-1,3-diol while the corresponding erythroisomer remains in the mother liquor.

It has furthermore been found that the oily product obtained from the treatment with agents capable to destroy nitrite ions can readily be converted into the well crystallizing salts of the corresponding aci-nitro compounds in an almost quantitative yield by the addition of basic compounds to the reaction mixture and, preferably, by the addition of sodium alcoholates. In said aci-nitro compounds, the difference between threo- and erythro-isomers is eliminated by the formation of the C=N-double bond. When said salts of the aci-nitro compounds are again treated in a weakly acid reaction medium with agents capable of destroying nitrite ions, a mixture of DL-threo- and DL-erythro-1-phenyl-2-nitro propane-1,3-diol is obtained from which the desired DL-threo-1-phenyl-2-nitro propane-1,3-diol is again separated in crystalline form by the use of suitable solvents and, preferably, by the use of di-n-butyl ether. Thus, the process according to the present invention permits to purify and to quantitatively convert the crude mixture of the diastereoisomeric nitro propanediols obtained from the condensation reaction of benzaldehyde with β-nitro ethanol or, respectively, of phenyl-β-nitro ethanol with formaldehyde into the desired DL-threo-1-phenyl-2-nitro propane-1,3-diol whereby the overall yield in the process for producing the valuable antibotic chloramphenicol is considerably increased.

Thus, the process according to the present invention consists in principle in subjecting salts of DL-1-phenyl-2-aci-nitro propane-1,3-diol in weakly acid medium to the action of agents capable of destroying nitrite ions, separating the readily crystallizing DL-threo-1-phenyl-2-nitro propane-1,3-diol from the resulting reaction mixture by means of suitable solvents and, particularly, by the use of di-n-butyl ether, adding basic agents to the residue, separating the resulting salt of the corresponding aci-nitro compound, subjecting said salt in weakly acid medium to the action of agents capable of destroying nitrite ions, separating the readily crystallizing DL-threo-1-phenyl-2-nitro propane-1,3-diol from the resulting reaction mixture of the free diastereoisomeric 1-phenyl-2-nitro propane-1,3-diols as described above, converting the remaining erythro-compound into the salt of the corresponding aci-nitro compound and again treating said salt as described hereinabove with agents capable of destroying nitrite ions, and repeating said operations.

By the process according to the present invention, the production of chloramphenical is considerably simplified in comparison with the known process and the yield of the final product is increased considerably.

The process of the present invention permits effective resolution of the mixture of the diastereoisomeric DL-1-phenyl-2-nitro propane-1,3-diols at an early stage in the synthesis and epimerization of the erythro-isomer which is useless for the preparation of chloramphenicol, into the threo-isomeric intermediate which has the same stereoisomeric configuration as chloramphenicol. The increase of the overall yield in the preparation of chloramphenicol is especially due to the fact that the pure DL-threo-1-phenyl-2-nitro propane-1,3-diol can be reduced in considerably higher yields than the crude mixture of the diastereoisomeric compounds obtained by the heretofore known processes. While such known processes yield only about 25% of the final product consisting of a mixture of the diastereoisomeric DL-1-phenyl-2-amino propane-1,3-diols and the yield of DL-threo-1-phenyl-2-amino propane-1,3-diol is about 10% of the theoretical yield, the catalytic reduction of the pure DL-threo-1-phenyl -2-nitro propane-1,3-diol obtained according to the present invention produces the desired DL-threo-1-phenyl-2-amino propane-1-3-diol in a yieuld of 90%. Such an increase in yield is of great importance in the the manufacture of the valuable antibiotic chloramphenicol.

The following example serves to illustrate the present invention without, however, limiting the same thereto. More particularly, the agent capable of destroying nitrite ions, the solvents and basic agents used, the reaction conditions, temperature, and duration, and the methods of purifying and isolating the reaction products and intermediates may be varied by those skilled in the art in accordance with the principles set forth herein and in the claims annexed hereto.

*Example*

87.6 g. (0.4 mole) of the sodium salt of DL-1-phenyl-2-aci-nitro propane-1,3-diol obtained by condensation of benzaldehyde with β-nitro ethanol in methanol in the presence of sodium methylate, are dissolved in 120 cc. of cold water while stirring and cooling. A solution of 55.6 g. (0.8 mole) of hydroxylamine hydrochloride in 280 cc.

of water cooled to −5° C. is added drop by drop to said solution at 0° C. within 20 minutes. A colorless oil separates. The resulting reaction mixture is stirred for 5 minutes with a mixture of 160 cc. of ether and 100 cc. of benzene at +5° C. The aqueous layer is separated and again extracted with a mixture of 100 cc. of ether and 100 cc. of benzene. The combined extracts are dried over sodium sulfate and are evaporated to dryness in a vacuum. 77.60 g. (corresponding to 98.5% of the theoretical yield) of a colorless, highly viscous oil are obtained.

To separate the diastereoisomers from each other, said crude condensation product is dissolved in 150 cc. of di-n-butyl ether and the resulting solution is cooled to 0° C. for three hours. The precipitated crystals are filtered with suction and washed with 50 cc. of cold di-n-butyl ether. Thereby, 14.22 g. of DL-threo-1-phenyl-2-nitro propane-1,3-diol melting at 90–91° C. are obtained. Another crop of 8.89 g. is obtained by allowing the mother liquor to stand in an ice-box for some time. By treating this product which is almost analytically pure, with 0.5 N hydrochloric acid and extraction with ether, further purification is achieved. The resulting colorless crystals of the pure threo-compound have a melting point of 93–94° C. The yield is 22.7 g. (corresponding to 29.3% of the theoretical yield).

Analysis.—$C_9H_{11}O_4N$=197.2. Calculated: 54.82% C.; 5.62% H; 7.10% N. Found: 55.10% C.; 5.76% H; 7.13% N.

Hydrogenation of said product in the presence of a palladium-charcoal catalyst at atmospheric pressure and at room temperature in glacial acetic acid yields exclusively DL-threo-1-phenyl-2-amino propane-1,3-diol with a melting point of 85–87° C. in a yield of 90% of the theoretical yield.

The di-n-butyl ether solution of DL-erythro-1-phenyl-2-nitro propane-1,3-diol remaining after separation of the DL-threo compound as described hereinabove is evaporated to dryness in a vacuum. The resulting colorless, highly viscous oil (56.45 g.) which consists of said erythro-isomer and small amounts of the solvent, can be used for conversion into the corresponding aci-nitro salt without further purification.

For identification and purification of the erythro-nitro propanediol compound, the oil is converted by reaction with acetone in the presence of phosphorus pentoxide into DL-erythro-2,2-dimethyl-5-nitro-6-phenyl-1,3-dioxane of the melting point 56–56.5° C. By hydrolyzing said compound by means of 0.5 N hydrochloric acid, analytically pure DL-erythro-1-phenyl-2-nitro propane-1,3-diol is obtained.

Analysis.—$C_9H_{11}O_4N$=197.2. Calculated: 54.82% C.; 5.62% H; 7.10% N. Found: 54.62% C.; 5.38% H; 6.99% N.

The corresponding erythro-amino diol compound which is described in the literature and which has a melting point of 105–106° C. is exclusively obtained by reducing said compound.

The crude DL-erythro-1-phenyl-2-nitro propane-1,3-diol obtained as described hereinabove is converted into the sodium salt of the corresponding aci-nitro compound in the following manner:

39.5 g. of the above described oily product (which still contains 1.42 g. of di-n-butyl ether) are dissolved in 40 cc. of anhydrous methanol. A cold solution of 4.6 g. of sodium metal in 50 cc. of anhydrous methanol is rapidly added thereto while stirring and cooling. After a few seconds, the content of the reaction flask solidifies to a colorless, compact gel which crystallizes after stirring for half an hour. 20 cc. of water-free ether are added to the crystals which are filtered with suction while ice-cold. The crystals are washed with small amounts of methanol and ether. After drying in a vacuum, the sodium salt of DL-1-phenyl-2-aci-nitro propane-1,3-diol is obtained in a yield of 36.86 g. (corresponding to 87.2% of the theoretical yield). Said sodium salt is again subjected to the resolution process with hydroxylamine hydrochloride as described hereinabove.

In place of hydroxylamine hydrochloride used in the preceding example, there can be employed equimolecular amounts of other nitrite destroying agents, such as urea hydrochloride, hydrazine hydrochloride, semicarbazide hydrochloride, or other acid addition salts of such nitrite destroying agents while otherwise the procedure is the same as described hereinabove in the above given example.

We claim:

1. In a process of producing DL-threo-1-phenyl-2-nitro propane-1,3-diol, the steps which comprise adding to an aqueous solution of the sodium salt of DL-1-phenyl-2-aci-nitro propane-1,3-diol at a temperature of about 0° C. an aqueous solution of hydroxylamine hydrochloride, extracting the precipitated oil from the aqueous mixture by means of a mixture of ether and benzene at a temperature of about 5° C., evaporating the resulting extracts in a vacuum to dryness, dissolving the remaining oil in di-n-butyl ether, cooling the resulting solution to about 0° C., and filtering off the resulting crystallized DL-threo-1-phenyl-2-nitro propane-1,3-diol.

2. In a process of producing DL-threo-1-phenyl-2-nitro propane-1,3-diol, the steps which comprise adding to an aqueous solution of the sodium salt of DL-1-phenyl-2-aci-nitro propane-1,3-diol at a temperature of about 0° C. an aqueous solution of hydroxylamine hydrochloride, extracting the precipitated oil from the aqueous mixture by means of a mixture of ether and benzene at a temperature of about 5° C., evaporating the resulting extracts in a vacuum to dryness, dissolving the remaining oil in di-n-butyl ether, cooling the resulting solution to about 0° C., filtering off the crystallized DL-threo-1-phenyl-2-nitro propanediol, distilling off in a vacuum the di-n-butyl ether from the filtrate, dissolving the remaining oily DL-erythro-1-phenyl-2-nitro propane-1,3-diol in methanol, adding to said solution a methanolic solution of sodium methylate, filtering off the resulting crystalline sodium salt of DL-erythro-1-phenyl-2-aci-nitro propane-1,3-diol, adding to an aqueous solution of said sodium salt of DL-1-phenyl-2-aci-nitro propane1,3-diol at a temperature of about 0° C. an aqueous solution of hydroxylamine hydrochloride, extracting the precipitated oil from the aqueous mixture by means of a mixture of ether and benzene at a temperature of about 5° C., evaporating the resulting extracts in a vacuum to dryness, dissolving the resulting oil in di-n-butyl ether, cooling the resulting solution to about 0° C., filtering off the crystallized DL-threo-1-phenyl-2-nitro propane-1,3-diol, and repeating the operations of distilling off in a vacuum the di-n-butyl ether from the filtrate, converting the remaining erythro-compound into the sodium salt of the corresponding aci-nitro compound, adding to an aqueous solution of said sodium salt hydroxylamine hydrochloride, extracting the precipitated oil by means of a mixture of ether and benzene at a temperature of about 5° C., evaporating to dryness the extracts, dissolving the remaining oil in di-n-butyl ether, cooling the resulting solution, and filtering off the crystallized DL-threo-1-phenyl-2-nitro propane-1,3-diol.

References Cited in the file of this patent

UNITED STATES PATENTS

| | | |
|---|---|---|
| 2,483,885 | Crooks et al. | Oct. 4, 1949 |
| 2,543,957 | Crooks et al. | Mar. 6, 1951 |

UNITED STATES PATENT OFFICE
CERTIFICATE OF CORRECTION

Patent No. 3,005,854

October 24, 1961

Franz Braun et al.

It is hereby certified that error appears in the above numbered patent requiring correction and that the said Letters Patent should read as corrected below.

Column 1, line 12, for "propane -1,3-" read -- propane-1,3- --; line 14, for "antobiotic" read -- antibiotic --; line 18, strike out "a"; lines 20 and 21, for "diastereoismeric" read -- diastereoisomeric --; same column 1, line 24, for "propanedoi read -- propanediols --; column 2, line 8, for "antibotic" read -- antibiotic --; line 30, for "chloramphenical" read -- chloramphenicol --; line 53, for "yieuld" read -- yield --; same column 2, line 54, strike out "the", second occurrence; column 4, line 47, for "propanel, 3-diol" read -- propane-1,3-diol --.

Signed and sealed this 10th day of April 1962.

(SEAL)
Attest:

ERNEST W. SWIDER
Attesting Officer

DAVID L. LADD
Commissioner of Patents